United States Patent
Hsieh

(10) Patent No.: US 6,756,747 B2
(45) Date of Patent: Jun. 29, 2004

(54) APPARATUS AND METHOD FOR ELIMINATING STRIATION OF FLUORESCENT LAMP WITH DIMMING CONTROL

(75) Inventor: Guan-Chyun Hsieh, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 0 days.

(21) Appl. No.: 10/285,142

(22) Filed: Oct. 30, 2002

(65) Prior Publication Data

US 2004/0085031 A1 May 6, 2004

(51) Int. Cl.[7] .............................................. H05B 37/02
(52) U.S. Cl. ............... 315/291; 315/209 R; 315/DIG. 4
(58) Field of Search ............................ 315/291, 209 R, 315/307, 224, DIG. 4, DIG. 5, DIG. 7; H05B 37/02

(56) References Cited

U.S. PATENT DOCUMENTS

| | | | | |
|---|---|---|---|---|
| 4,415,839 A | * | 11/1983 | Lesea | 315/308 |
| 4,791,338 A | * | 12/1988 | Dean et al. | 315/174 |
| 6,013,969 A | * | 1/2000 | Noma et al. | 310/318 |
| 6,087,785 A | | 7/2000 | Hsieh et al. | 315/276 |
| 6,208,064 B1 | * | 3/2001 | Furuhashi et al. | 310/316.01 |
| 6,486,618 B1 | * | 11/2002 | Li | 315/291 |

OTHER PUBLICATIONS

Laszlo Laskai et al., "A Unity Power Factor Electronic Ballast for Metal Halide Lamps", 1994 IEEE, pp. 31–37.

* cited by examiner

Primary Examiner—Don Wong
Assistant Examiner—Trinh Vo Dinh
(74) Attorney, Agent, or Firm—Haverstock & Owens LLP

(57) ABSTRACT

A generator is used in a controllable dimmer ballast of a fluorescent lamp for eliminating a striation. The generator includes an interface for transforming an input signal to a first input voltage and a second input voltage, an oscillator electrically connected to the interface for receiving the first input voltage and producing a pair of complementary pulse trains, a comparator electrically connected to the interface for receiving and comparing the second input voltage with a given threshold voltage and providing an enable signal, and a controller electrically connected to the oscillator and the comparator for alternately modulating the pulse trains and providing a first and a second control signals according to the pulse trains and the enable signal so as to eliminate the striation of the lamp.

18 Claims, 17 Drawing Sheets

APPARATUS AND METHOD FOR ELIMINATING STRIATION OF FLUORESCENT LAMP WITH DIMMING CONTROL

FIELD OF THE INVENTION

The present invention generally relates to a lighting device. More particularly, the present invention relates to an apparatus and a method used in a lighting device for eliminating striation in a fluorescent lamp with dimming control.

BACKGROUND OF THE INVENTION

The gas-discharging lamps have been the primary lighting sources in the industrial and residential uses since their development in the 1930's. They possess advantageous features including high color rendering, soft-visualization, and low energy consumption, etc. Today, fluorescent lamps are still commonly used.

A schematic diagram of a lighting device using a fluorescent lamp is depicted in FIG. 1. Referring to FIG. 1, a voltage source $V_D$ is fed to a fluorescent lamp 10 through a ballast 20. The capacitor $C_S$ disposed across one terminal of the electrode 12a and one terminal of the electrode 12b serves as a starting capacitor. The inductor $L_R$ connected between the other terminal of the electrode 12a and the ballast 20 serves as a resonant inductor. The ballast 20 is comprised by a series-resonant inverter (SRI) for providing high frequency (about 20 kHz to 65 kHz) driving voltage. Before igniting the fluorescent lamp 10, the inside of the fluorescent lamp 10 is not in a conduction state and thus the resonant inductor $L_R$, the filament resistance, and the starting capacitor $C_S$ make up a series-resonant circuit. After igniting the fluorescent lamp 10, the inside of the fluorescent lamp 10 is in a conduction state, and is equivalent to resistors shunted with the capacitor $C_S$.

In the last decade or so, versatile fluorescent lamps have been developed for improving the quality of lighting environments. Nowadays, it is the trend to develop multi-functional lamp systems with dimming control, while maintaining high power quality, to achieve a more comfortable lighting environment. High power factor correction for raising the power quality is available in lamp design. However, when utilizing low-level dimming control, a low frequency snake-like striation in the lamp due to relatively significant odd-order harmonic amplitudes of the lamp current inevitably disturbs the dimming performance. This phenomenon is depicted in FIG. 2. Inside the fluorescent lamp 10, the hot electron beam 16 is in a state similar to a standing wave; therefore, the area 18 inside the fluorescent lamp 10 presents darker illumination due to lack of electron stimulation. The periodical striation may result in the luminance unstable, flicker, deforming, deflection, and even disappearing. Besides, it may disturb the operation of the lamp and raise the lamp temperature.

The early techniques for solving the mentioned striations in the fluorescent lamp include changing the gas ingredients or the lamp geometry, modulating the lamp current with FM to be out of the resonant band, and using an FM PWM strategy to spread the lamp power in different bands which is proposed by Laskai as described in the paper "A unity power factor electronic ballast for metal halide lamps," Proc. IEEE APEC'94, pp. 31–37, 1994. However, these approaches are useless for lowering the amplitudes of the odd-order harmonics in a suitable level to reduce the striations. Lately, Hsieh et al. successfully proposed strategy for breaking the striations by modulating the lamp filament current with a harmonized circuit to uniformly spread the lamp energy into every harmonic to achieve wonderful low-level dimmer, as described in U.S. Pat. No. 6,087,785, July 2000. However, this approach still causes extra power loss of the lamp due to employing large signal driving in the lamp current feedback modulation.

Keep the drawbacks of the prior art in mind, and employ experiments and research full-heartily and persistently, the apparatus and method using small signal driving for eliminating striation of fluorescent lamp are finally conceived by the applicant.

SUMMARY OF THE INVENTION

It is therefore an object of the present invention to propose a generator used in a controllable dimmer ballast of a fluorescent lamp for eliminating a striation.

It is therefore another object of the present invention to propose an apparatus used in a gas-discharging lamp with a first electrode and a second electrode for eliminating a striation.

It is therefore another object of the present invention to propose a method for preventing a light apparatus from a striation.

According to the aspect of the present invention, the generator used in a controllable dimmer ballast of a fluorescent lamp for eliminating a striation includes an interface for transforming an input signal to a first input voltage and a second input voltage, an oscillator electrically connected to the interface for receiving the first input voltage and producing a pair of complementary pulse trains, a comparator electrically connected to the interface for receiving and comparing the second input voltage with a threshold voltage and providing an enable signal, and a controller electrically connected to the oscillator and the comparator for alternately modulating the pulse train so as to eliminate the striation of the lamp.

Preferably, the generator used in a controllable dimmer ballast of a fluorescent lamp is a controllable asymmetrical group-pulse train generator (CAGPTG).

Preferably, the input signal of the generator is an adjustable voltage.

Preferably, the oscillator of the generator is a constant-duty-cycle voltage-controlled-oscillator (CDC-VCO).

Preferably, the controller of the generator is an asymmetrical-group-pulse-width-modulated (AGPWM) controller.

Preferably, the controller of the generator further provides a first and a second control signals according to the pulse trains and the enable signal.

Preferably, the fluorescent lamp further includes a first electrode and a second electrode, a starting capacitor coupled between the first and second electrodes, and a resonant inductor coupled between the ballast and one of the first and second electrodes of the lamp.

Preferably, the ballast of the fluorescent lamp further includes a half-bridge series-resonant inverter (HB-SRI).

Preferably, AGPWM controller of the generator further includes a square-wave-generator (SWG) for generating a square-wave signal, a group-pulse alternator (GPA) electrically connected to the SWG for receiving the enable signal and the square-wave signal and producing two complimentary signals, and a duty-cycle-controller (DCC) electrically connected to the GPA and the CDC-VCO for receiving the two complimentary pulse trains and the two complimentary signals and producing the first and second control signals.

According to another aspect of the present invention, the apparatus used in a gas-discharging lamp with a first and a second electrodes for eliminating a striation includes an interface for transforming an input signal to a first input voltage and a second input voltage, an oscillator electrically connected to the interface for receiving the first input voltage and producing a pair of complementary pulse trains, a comparator electrically connected to the interface for receiving and comparing the second input voltage with a given thresh threshold voltage and providing an enable signal, a controller electrically connected to the oscillator and the comparator for alternately modulating the pulse trains and providing a first and a second control signals according to the pulse trains and the enable signal, and a HB-SRI for driving the lamp according to the first and second control signals, so as to eliminate the striation.

Preferably, the oscillator of the apparatus is a constant-duty-cycle voltage-controlled-oscillator (CDC-VCO).

Preferably, the controller of the apparatus is an asymmetrical-group-pulse-width-modulated (AGPWM) controller.

Preferably, the AGPWM controller of the apparatus further includes a SWG for generating a square-wave signal, a GPA electrically connected to said SWG for receiving the enable signal from the comparator and the square-wave signal from the SWG and producing two complimentary signals, and a DCC electrically connected to the GPA and the CDC-VCO for receiving the complimentary pulse trains and the complimentary signals and producing the first and second control signals.

According to another aspect of the present invention, the method for preventing a light apparatus from a striation includes steps of providing an adjustable voltage, transforming the adjustable voltage to a first input voltage and a second input voltage, providing a pair of complementary pulse trains according to the first voltage, comparing the second input voltage to a given threshold voltage for providing an enable signal, and obtaining a first and a second control signals by means of alternately modulating the pulse trains according to the enable signal for driving the light apparatus.

Preferably, the method for preventing a light apparatus from a striation further includes a step of providing the first and second control signals to the light apparatus by means of executing a signal process to reduce a plurality of odd-order harmonic amplitudes of a lamp current and to increase a plurality of even-order harmonic amplitudes of the lamp current for eliminating the striation of the lamp.

Preferably, the first and second control signals for preventing a light apparatus from a striation are in a form of symmetrical constant-duty-cycle pulse trains when the adjustable voltage is greater than a specific level and the enable signal is in a first state.

Preferably, the second control signal for preventing a light apparatus from a striation is in a form of asymmetrical constant-duty-cycle pulse train during a first half period of a specified low-frequency-modulated period when said adjustable voltage is less than a specific level and the enable signal is in the second state.

Preferably, the first control signal for preventing a light apparatus from a striation is in a form of asymmetrical constant-duty-cycle pulse train during a second half period of a specified low-frequency-modulated period when the adjustable voltage is less than a specific level and the enable signal is in the second state.

Preferably, the adjustable voltage for preventing a light apparatus from a striation is ranged from 0 to 10 v.

Preferably, the specific level for preventing a light apparatus from a striation is 5 v.

Preferably, the first state of enable signal for preventing a light apparatus from a striation is 0.

Preferably, the second state of enable signal for preventing a light apparatus from a striation is 1.

BRIEF DESCRIPTION OF THE DRAWINGS

FIG. 5($b$) is the circuit scheme and the truth table of the GPA;

FIG. 7($b$) illustrates the duty-cycle control with respect to switching frequency fs for the asymmetrical group-pulse train;

DETAILED DESCRIPTION OF THE PREFERRED EMBODIMENT

Figure 1:
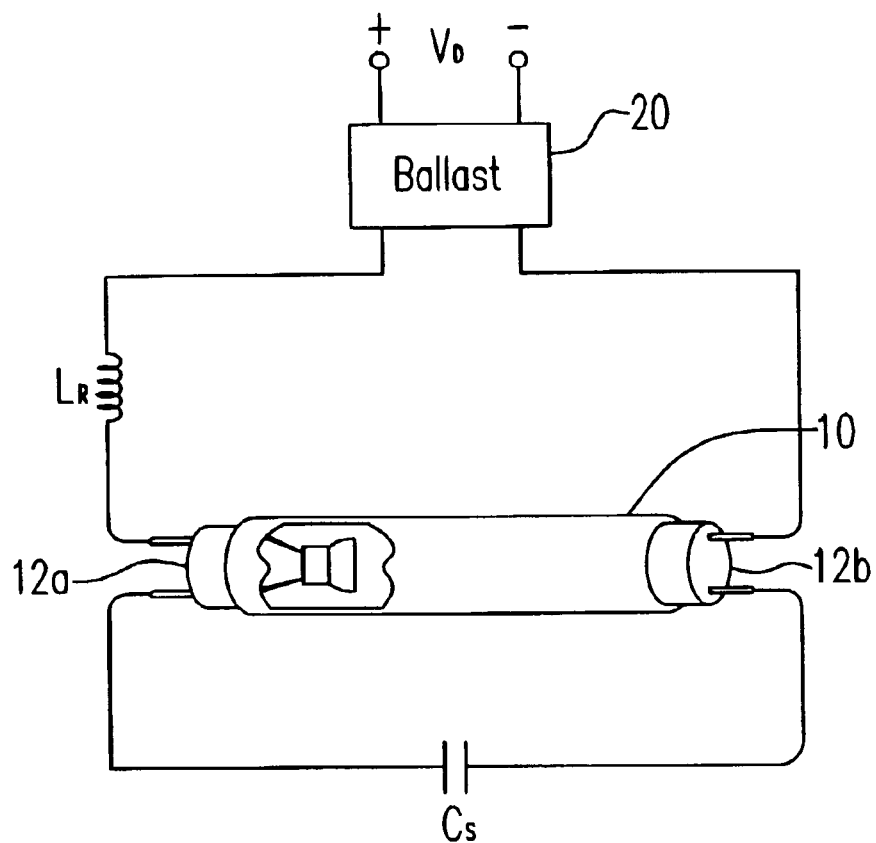
FIG. 1 is the schematic diagram of a lighting device with a fluorescent lamp according to the prior art.
Figure 2:
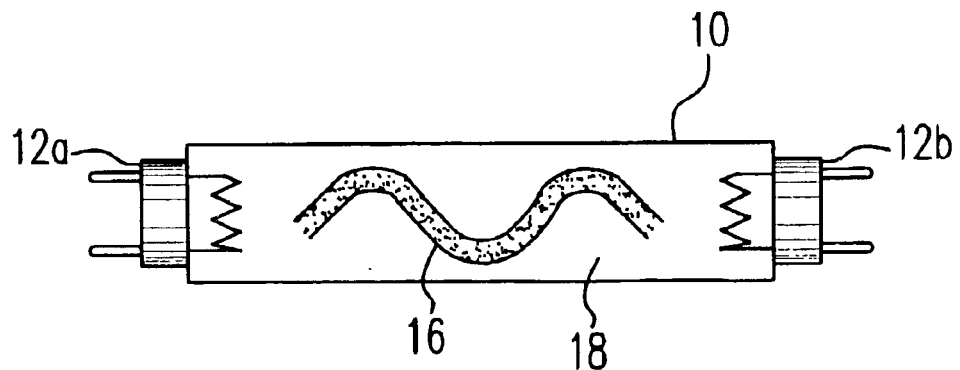
FIG. 2 shows a snake-like striation phenomenon in the lamp when a conventional fluorescent lamp is in a low level dimming condition.
Figure 3:
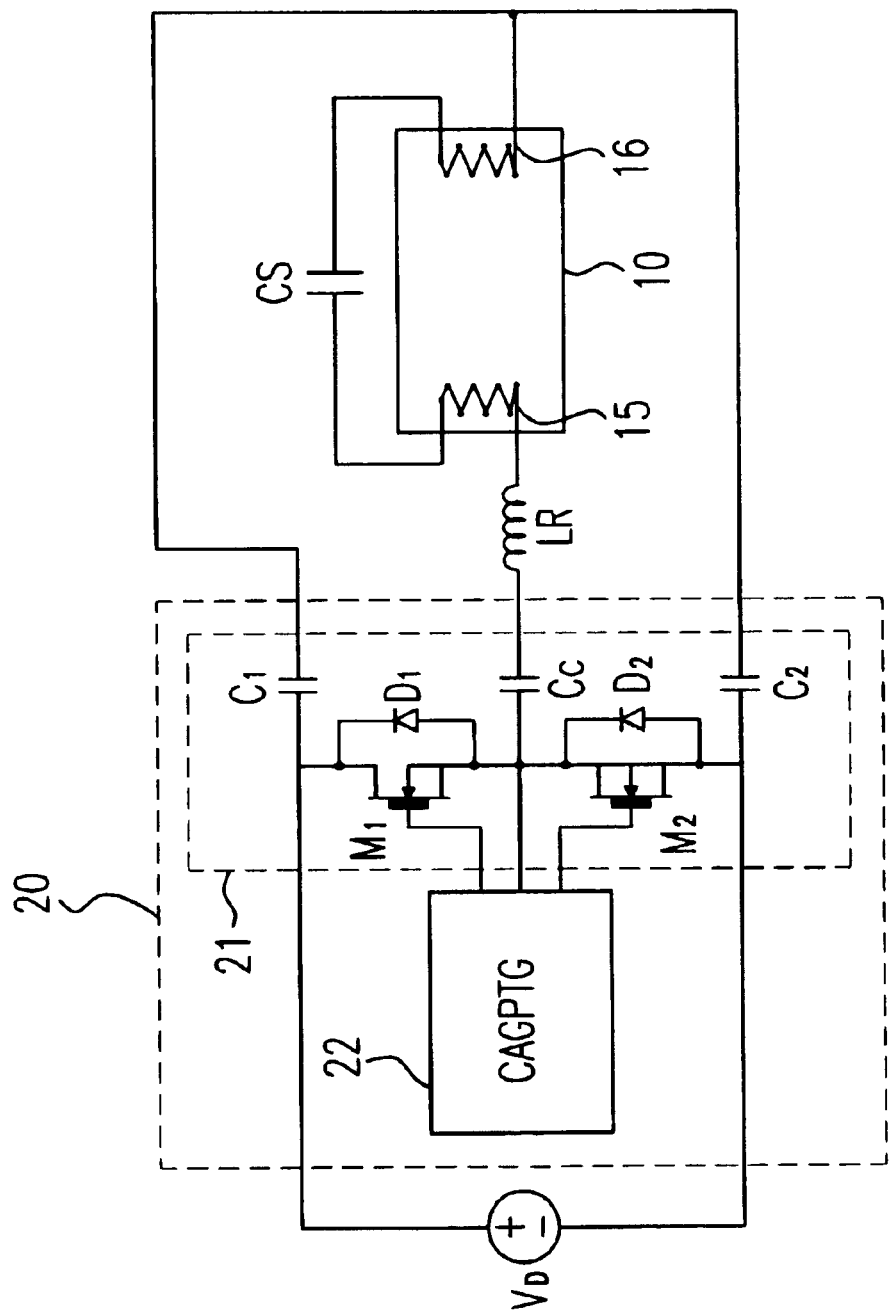
FIG. 3 is the circuit topology of the present invention.

FIG. 3 schematically illustrates the circuit topology of the embodiment according to the present invention. In FIG. 3, the external voltage source $V_D$, the ballast 20, the resonant inductor $L_R$, the fluorescent lamp 10, and the starting capacitor $C_S$ are the conventional components applied in general light apparatuses. Two electrodes of the fluorescent lamp 10 are represented by two filaments 15 and 16 respectively. In this embodiment, the ballast 20 is based on the topology of the HB-SRI 21. In FIG. 3 the HB-SRI 21 includes transistors $M_1$ and $M_2$, parasitic diodes $D_1$, and $D_2$, and capacitors $C_1$, $C_2$ and $C_C$. The CAGPTG 22 generates a first controlling signal $V_C$ and a second controlling signal $V_d$ and supplies them to the transistors $M_1$ and $M_2$ (as shown in FIG. 3) for controlling on and off states, respectively. The transferring frequency of the external voltage $V_D$ is determined by the on-off switching frequency of the transistors $M_1$ and $M_2$. The approach of the present invention is mainly realized by CAGPTG 22 through alternately modulating the pulse-width of a group-driving signal with a suitable period. The proposed signal process can reduce the odd-order harmonic amplitudes of the lamp current and increase the even ones. The neighbor harmonic amplitudes of the lamp current are then uniformly distributed in a rate and close to each other. Therefore, the striation is disappeared during a wide luminance range in particular for the low-level dimmer. The lighting efficiency increase and the total harmonic distortion is reduced.

Figure 4:
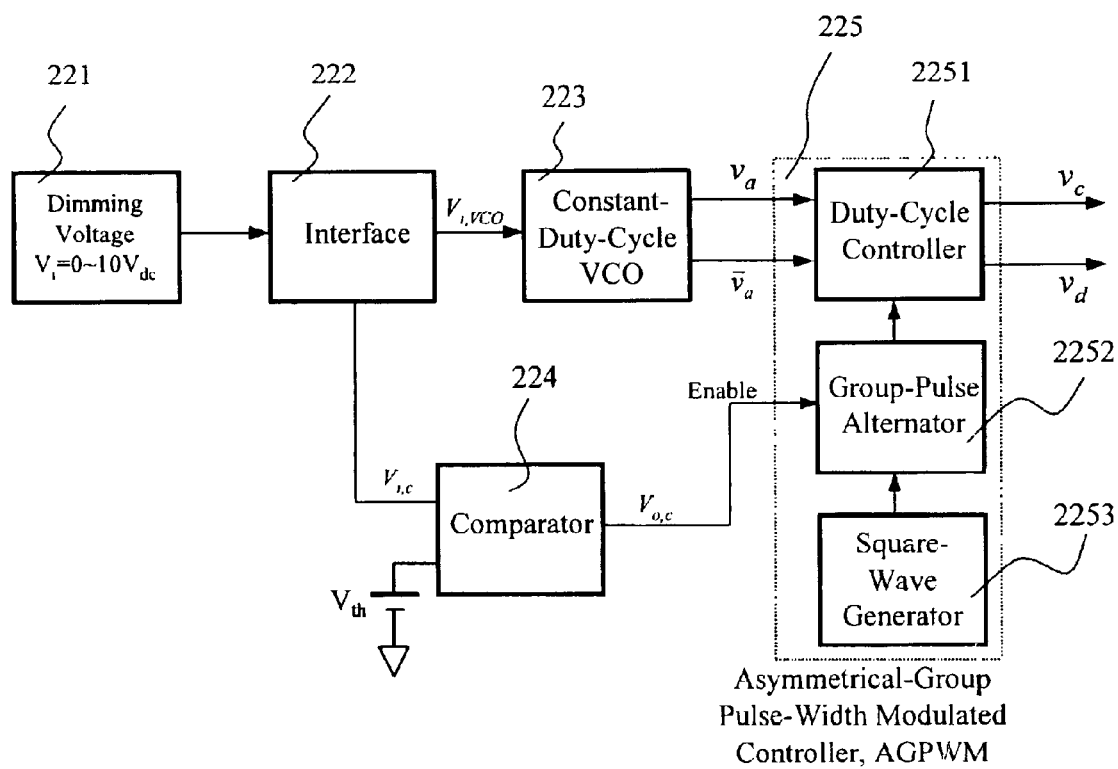
FIG. 4 is the block diagram of a CAGPTG.
Figure 5A:
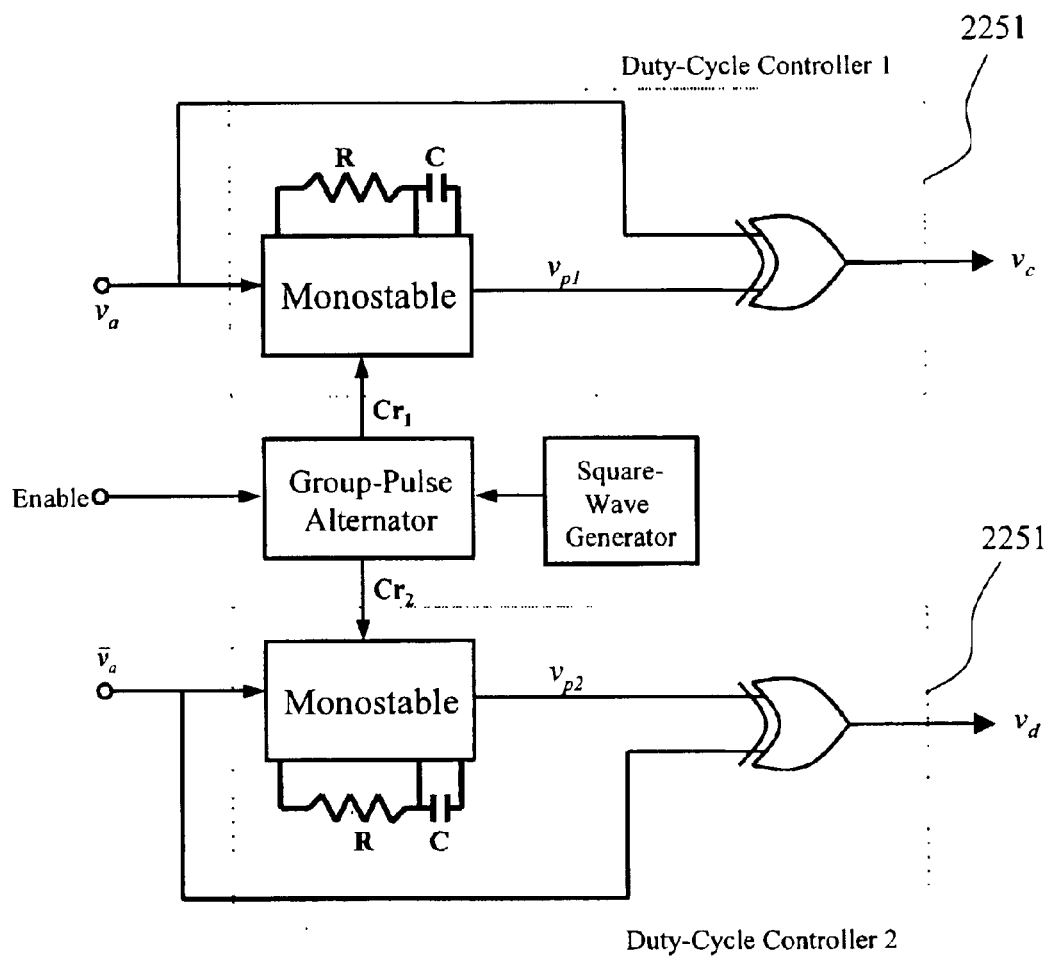
FIG. 5($a$) is the circuit scheme of the AGPWM controller.
Figure 5B:
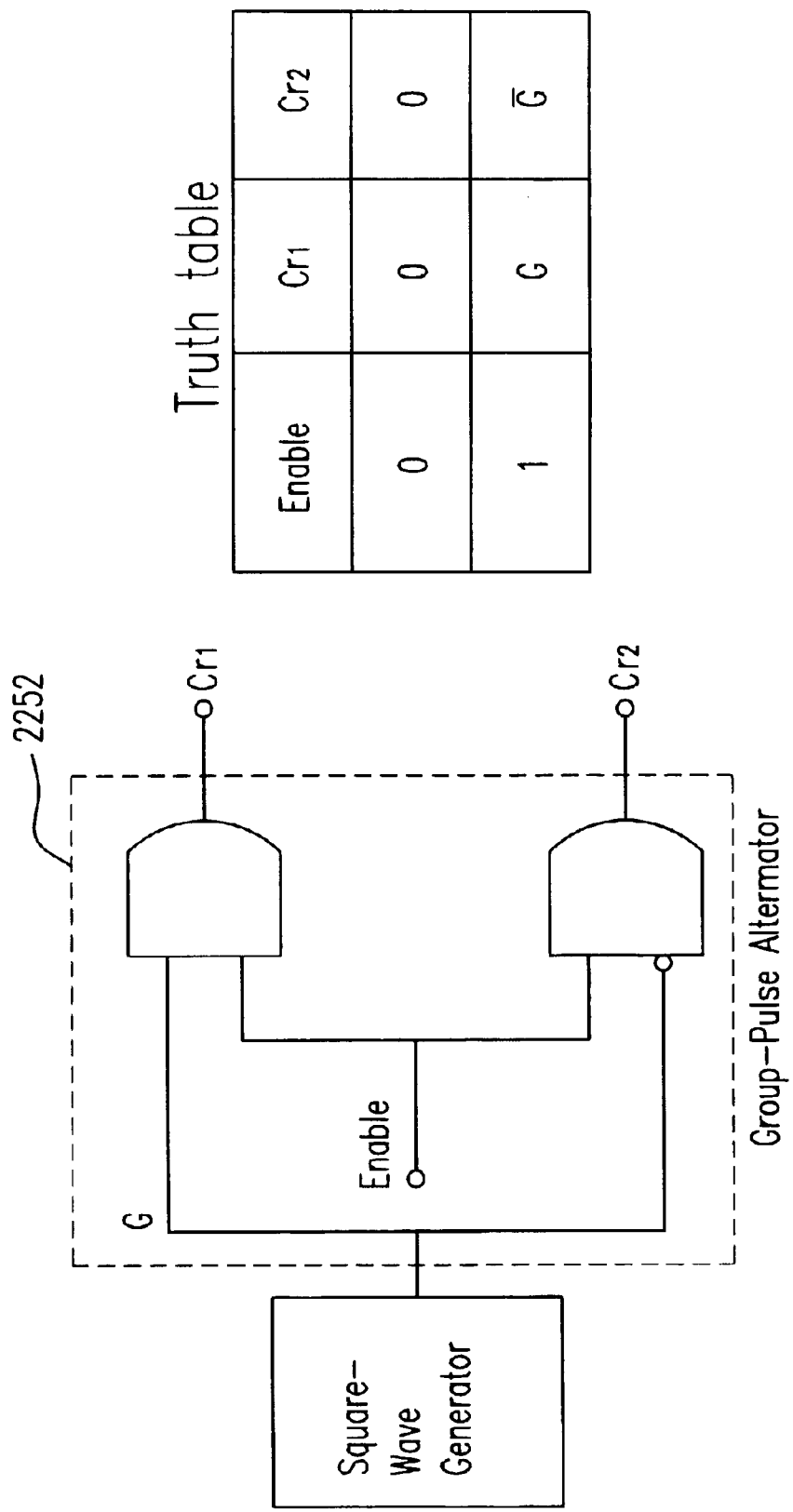
Figure 6A:
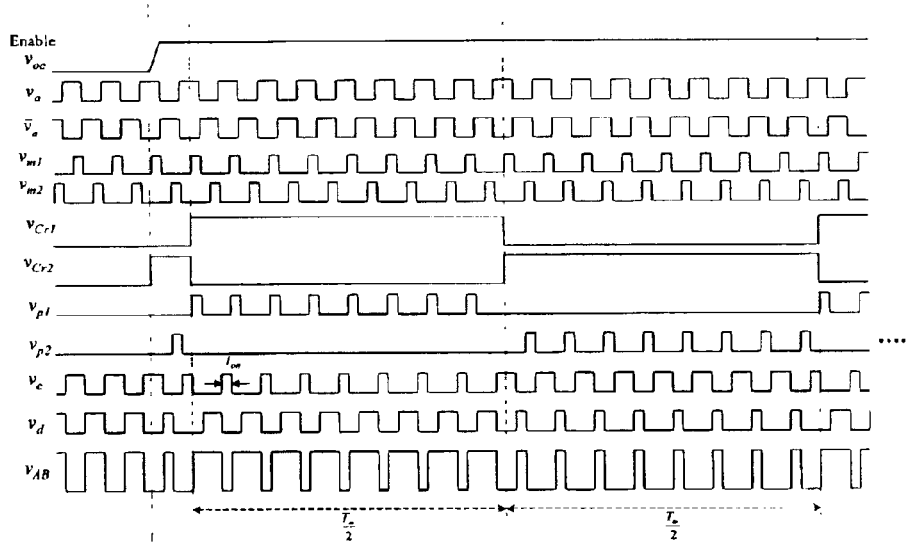
FIGS. 6($a$) and 6($b$) illustrate the status of the sequential control pulse timing in the AGPWM controller.
Figure 6B:
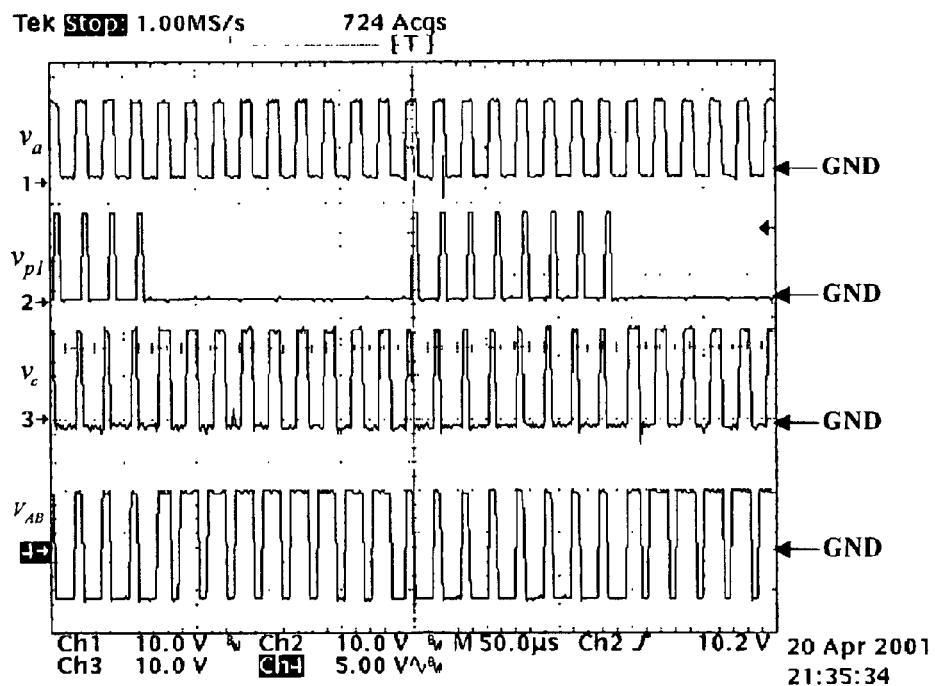
Figure 7A:
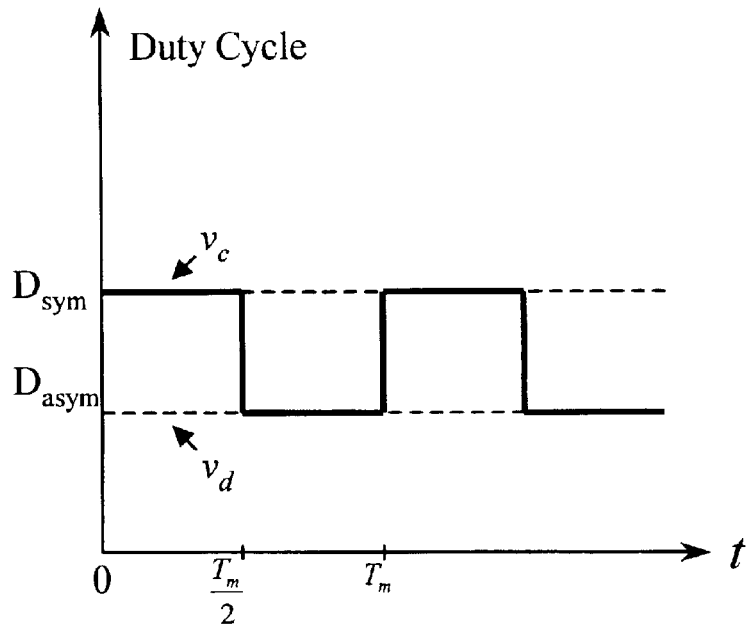
FIG. 7($a$) illustrates the alternately specified timing in GPA when $f_s > f_c$.
Figure 7B:
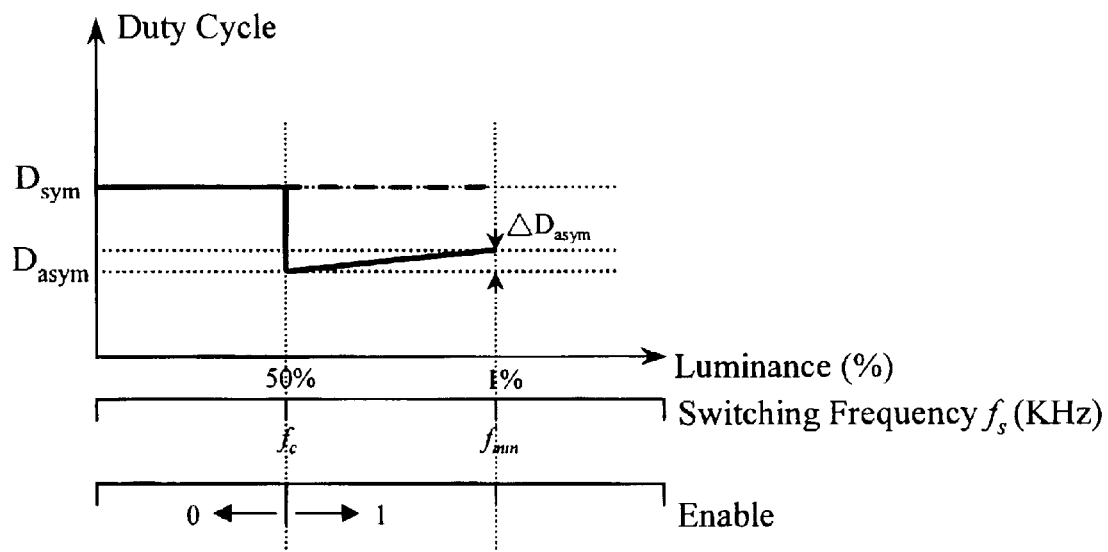

FIG. 4 shows the block diagram of a controllable asymmetrical group-pulse train generator. The generator consists of a dimming voltage 221 from 0–10$V_{dc}$, an interface 222, a CDC-VCO 223, a comparator 224, and an AGPWM controller 225. The dimming voltage comes from either a sensor or other proper device and is sent to the interface 222 as an input signal for the dimming level control. A reference threshold voltage $V_{th}$ compared with $V_{i,c}$ is used to define the duty-cycle of the driving pulse train from CDC-VCO 223 in symmetrical or asymmetrical. The CDC-VCO 223 always provides a constant-duty cycle pulse train for both two complimentary output $v_a$ and $\overline{v_a}$ with a specified constant duty. The proposed AGPWM 225 is composed of a DCC 2251, a GPA 2252 controlled by an enable and a SWG 2253. The GPA 2252 as shown in FIG. 5(b) is used to alternately modulate the duty cycle of the pulse train from CDC-VCO 223 based on the truth table. The duty-cycle control strategy of the AGPWM 225 controller is shown in Table 1. The duty-cycle modulation proceeds when the dimming luminance is less than 50% since the striation begins more significant. The DCC 2251 as shown in FIG. 5(a) still provides $v_c=v_a$ and $v_d=\overline{v_a}$ in a form of symmetrical constant-duty-cycle pulse train when the dimming luminance is greater than 50% and $f_s \leq f_c$; otherwise, when $f_s > f_c$ and the dimming level is less than 50%, one of the two pulse trains is alternately in asymmetrically duty-cycle-modulated pulse train during half period $T_m/2$, where $T_m$ is a specified low-frequency-modulated period. The critical frequency $f_c$ from CDC-VCO 223 is specified as a dimming reference. The status of the sequential control timing for the pulse trains in AGPWM controller 225 is built in FIG. 6(a) and its test signals by experiment are shown in FIG. 6(b) for comparison. The GPA 2252 provides an alternate low-frequency signal for modulating the two pulse trains in AGPWM 225, the modulating timing is scheduled as shown in FIG. 7(a) when $f_s > f_c$, in which both two pulse trains are defined in group-duty-cycle and changed every half period of $T_m$. Due to the dimming process is frequency-dependent with constant-on-time control, the modulated duty-cycle will be in reverse proportional to the switching frequency as shown in FIG. 7(b), in which $\Delta D_{asym}$ is a specified maximum duty-cycle deviation.

TABLE 1

TYPICAL DUTY-CYCLE CONTROL STRATEGY FOR A REAL AGPWM CONTROLLER

| Switching Frequency, $f_s$ | $\leq f_c$ | $>f_c$ |
|---|---|---|
| Enable | 0 | 1 |
| $D_{sym}$ | 45% For $\begin{cases} v_c(t)^1 = v_a(t) \\ v_d(t) = v_a(t) \end{cases}$ | |
| $D_{asym}$ | | 20%→24% (Constant-on-time control w.r.t.$f_s$) Alternate group-pulse modulation $\begin{cases} v_c(t) = v_a(t) \\ v_d(t) \neq v_a(t) \end{cases}$, $0 \leq t < \dfrac{T_m}{2}$ $\begin{cases} v_c(t) \neq v_a(t) \\ v_d(t) = v_a(t) \end{cases}$, $\dfrac{T_m}{2} \leq t < T_m.$ |
| Dimming Luminance (%) | $\geq 50$ | $<50$ |

Figure 8A:
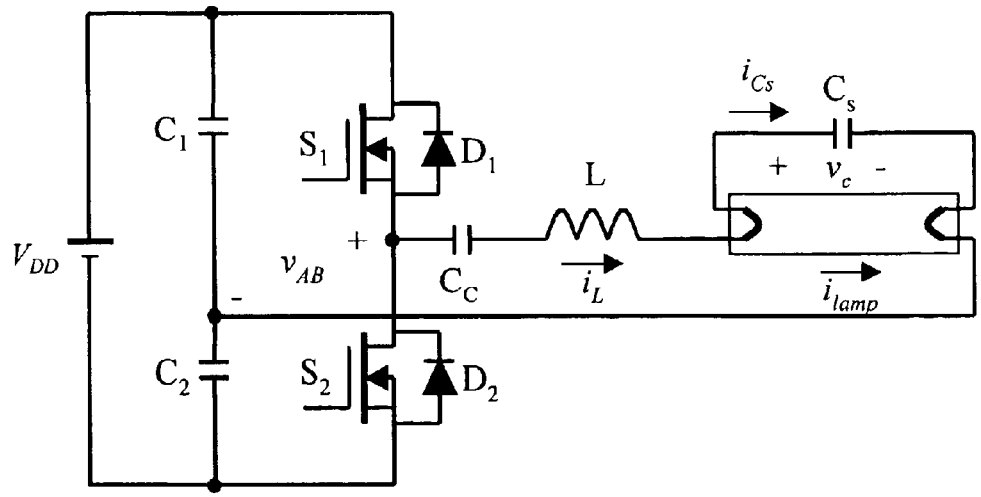
FIG. 8($a$) and 8($b$) illustrate the physical model and the equivalent circuit of the typical HB-SRI.
Figure 8B:
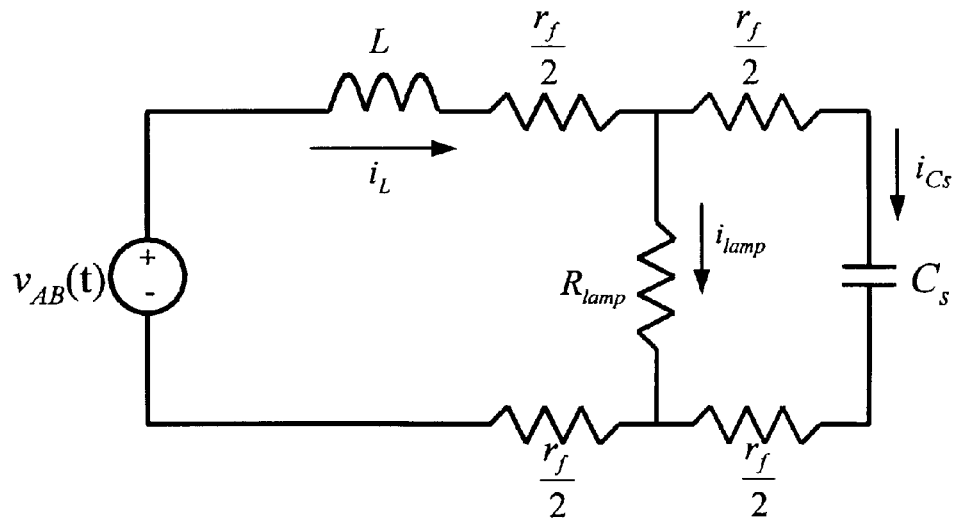

The circuit topology of a typical HB-SRI 21 for a fluorescent lamp is shown in FIG. 8(a), in which a series resonant tank is formed by a ballast inductor L and a starting capacitor $C_S$. The fluorescent lamp is always viewed as an open lumped element before firing and can be modeled as a Y model after firing as shown in FIG. 8(b), in which $R_{lamp}$ is lamp resistance and $r_f$ is the filament resistance. The voltage $v_{AB}(t)$ in FIG. 8(b) is for the drives of the series-resonant tank and can be described by $$v_{AB}(t) = \begin{cases} V_{DD}/2, & 0 \leq t < \dfrac{\pi}{\omega_s} \\ -V_{DD}/2, & \dfrac{\pi}{\omega_s} \leq t \leq \dfrac{2\pi}{\omega_s} \end{cases} \quad (1)$$

where $\omega_s$ is the switching frequency. By Fourier series expansion, (1) can be expressed by $$v_{AB}(t) = \sum_{n=odd} v_{ABn}(t) = \dfrac{V_{DD}}{2}\left\{\dfrac{4}{\pi}\sum_{n=odd}\dfrac{\sin n\omega_s t}{n}\right\} \quad (2)$$

$$= \sum_{n=odd} V_{ABn}\sin(n\omega_s t)$$

where $$v_{tBm} = 2V_{DD}/n\pi, \quad (3)$$

From FIG. 8(b) and (2), by phase analysis, the nth harmonic currents $I_{Ln}$ in inductor and $I_{Csn}$ in starting capacitor can be described by $$\begin{bmatrix} jn\omega_s L + 2r_f + R_{lamp} & -R_{lamp} \\ -R_{lamp} & R_{lamp} + 2r_f + \dfrac{1}{jn\omega_s C_s} \end{bmatrix} \begin{bmatrix} I_{Ln} \\ I_{Csn} \end{bmatrix} = \begin{bmatrix} \dfrac{2V_{DD}}{n\pi} \\ 0 \end{bmatrix} \quad (4)$$

where $I_{Ln}=I_{Ln}e^{-j\phi_{Ln}}$ and $I_{Cm}=I_{Cm}e^{-j\phi_{Ln}}$. The nth inductor current $i_{Ln}(t)$ can be given in the form of $$i_{Ln}(t) = I_{Ln}\sin(n\omega_s t - \phi_{Ln}), \quad (5)$$

where $$I_{Ln} = \frac{2V_D}{n\pi}\sqrt{\frac{(R_{lamp}+2r_f)^2 + (n\omega_s C_s)^{-2}}{A_n^2 + B_n^2}}, \quad (6)$$

$$\phi_{Ln} = \tan^{-1}\frac{1}{n\omega_s C_s(R_{lamp}+2r_f)} + \tan^{-1}\frac{B_n}{A_n}, \quad (7)$$

$$A_n = (2r_f)^2 + 4r_f R_{lamp} + \frac{L}{C_s}, \quad (8)$$

$$B_n = \frac{(R_{lamp}+2r_f)(n^3\omega_s^2 LC_s - 1)}{n\omega_s C_s}. \quad (9)$$

and the nth starting capacitor current $i_{Csn}(t)$ is in the form of $$i_{Csn}(t) = I_{Csn}\sin(n\omega_s t - \phi_{Csn}), \quad (10)$$

where $$I_{Csn} = \frac{2V_{DD}}{n\pi}\frac{R_{lamp}}{\sqrt{A_n^2+B_n^2}}, \quad (11)$$

$$\phi_{Csn} = \tan^{-1}\frac{B_n}{A_n}. \quad (12)$$

From (5) and (10), the nth $i_{lamp,n}(t)$ in the lamp can be given by $$i_{lamp,n}(t) = i_{Ln}(t) - i_{Csn}(t) \quad (13)$$
$$= I_{lamp,n}\sin(n\omega_s t - \phi_{Ln}),$$

where $$I_{lamp,n} = \frac{2V_{DD}}{n\pi}\sqrt{\frac{(2r_f)^2 + (n\omega_s C_s)^{-2}}{A_n^2+B_n^2}}, \text{ and} \quad (14)$$

$$\phi_{lamp,n} = \tan^{-1}\frac{1}{2n\omega_s C_s r_f} + \tan^{-1}\frac{B_n}{A_n}. \quad (15)$$

Thus, the complete lamp current $i_{lamp}(t)$ can be obtained by $$i_{lamp}(t) = \sum_{n=odd} i_{lamp,n}(t) \quad (16)$$
$$= \sum_{n=odd} I_{lamp,n}\sin(n\omega_s t - \phi_{Ln})$$

Figure 9:
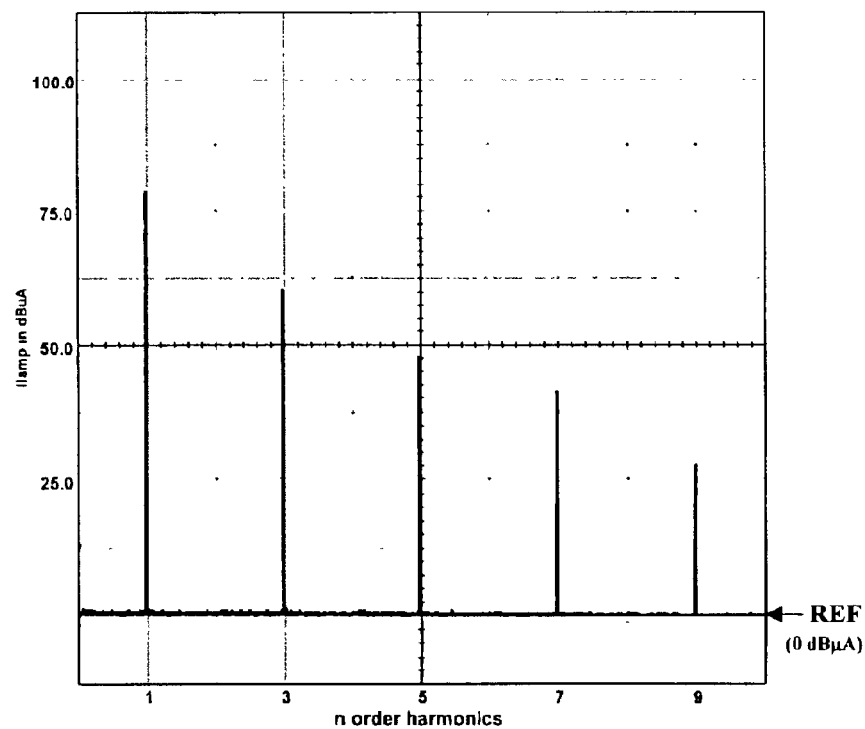
FIGS. 9(1$a$) 9(1$b$), 9(2$a$), and 9(2$b$) illustrate the frequency responses the lamp current of a typical HB-SRI ballast with dimmer control at dimming luminance 100% and 5%.
Figure 9:
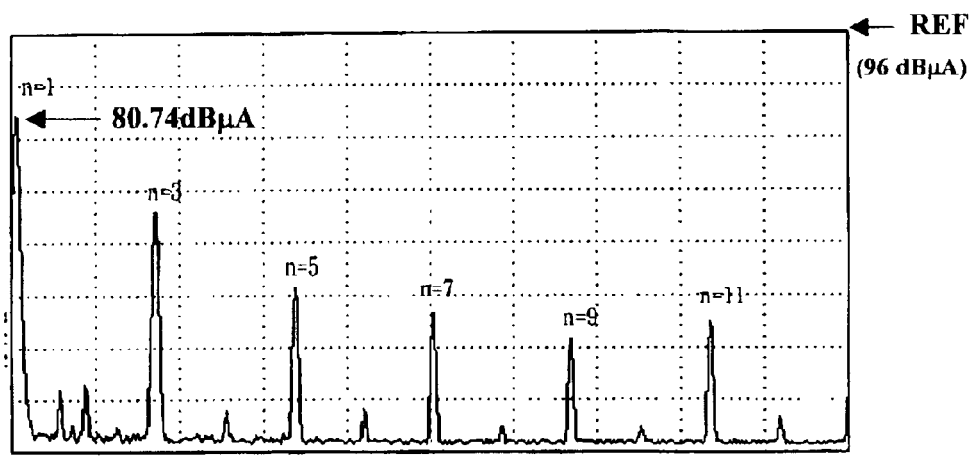
Figure 9:
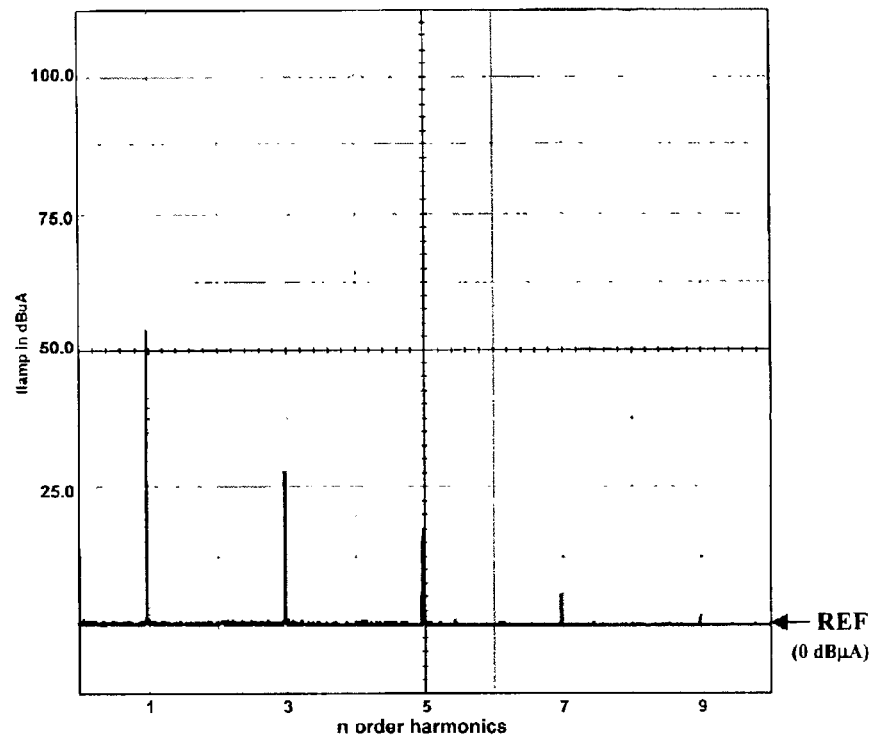
Figure 9:
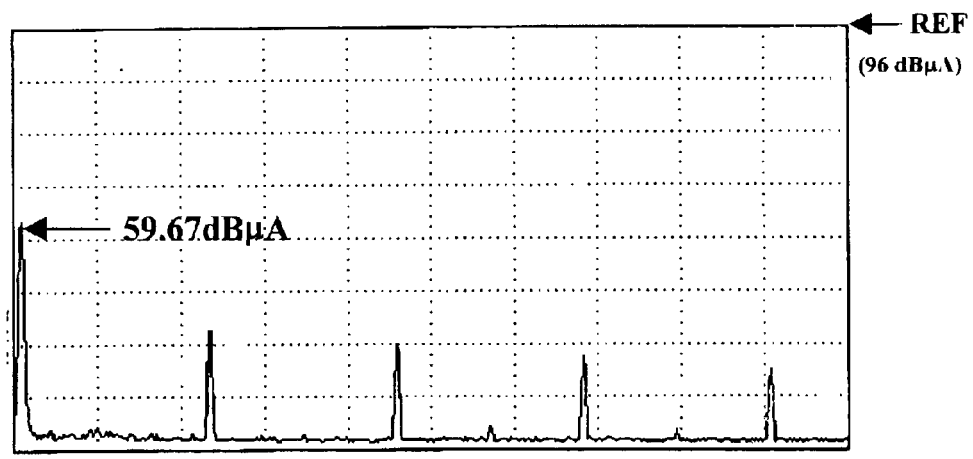

By Fourier series expansion to equation (16), the frequency responses of the lamp current for typical hB-SRI ballast with dimmer control 20 under luminance at 100% and 5% in simulation and experimentation are respectively shown in FIGS. 9(*a*) and 9(*b*). It is obvious that only the odd harmonica exist in the lamp current spectra for high-level or low-level luminance. Remarkably, since much more high amplitudes of odd harmonics in the high-level dimmer are significant in full luminance and the striation is not obvious. But for the low-level dimmer, the fundamental (n=1) and third (n=3) harmonics are more significant compared with the rest odd harmonics and the striation is then obvious in low luminance. This is the primary cause of generating striation in the fluorescent lamp.

Figure 10A:
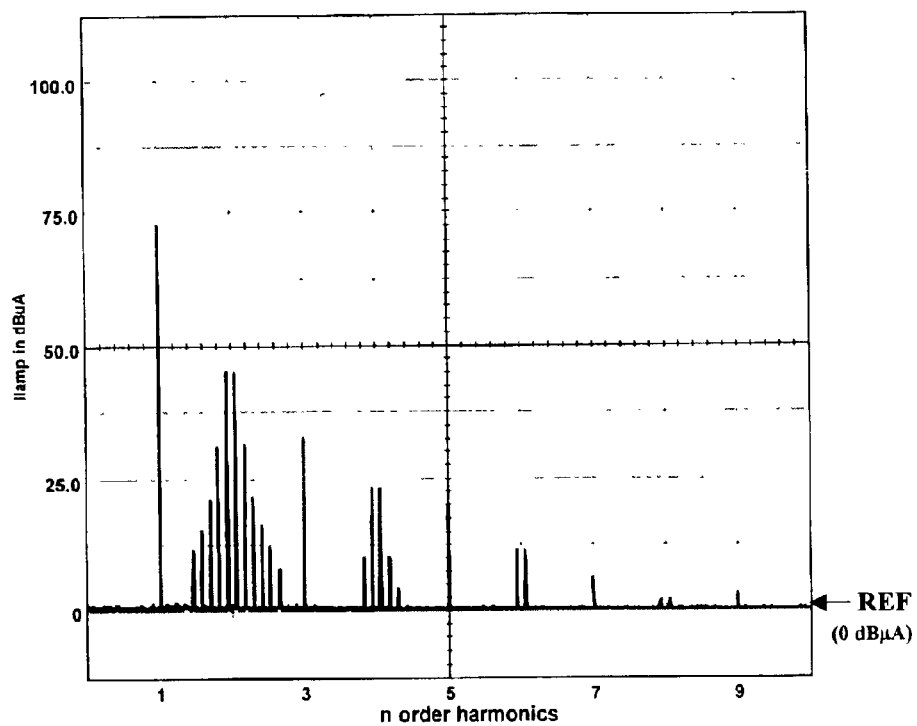
FIGS. 10($a$) and 10($b$) illustrate the simulated spectra of the lamp current with AGPWM controller at dimming luminance 100% and 5%.
Figure 10B:
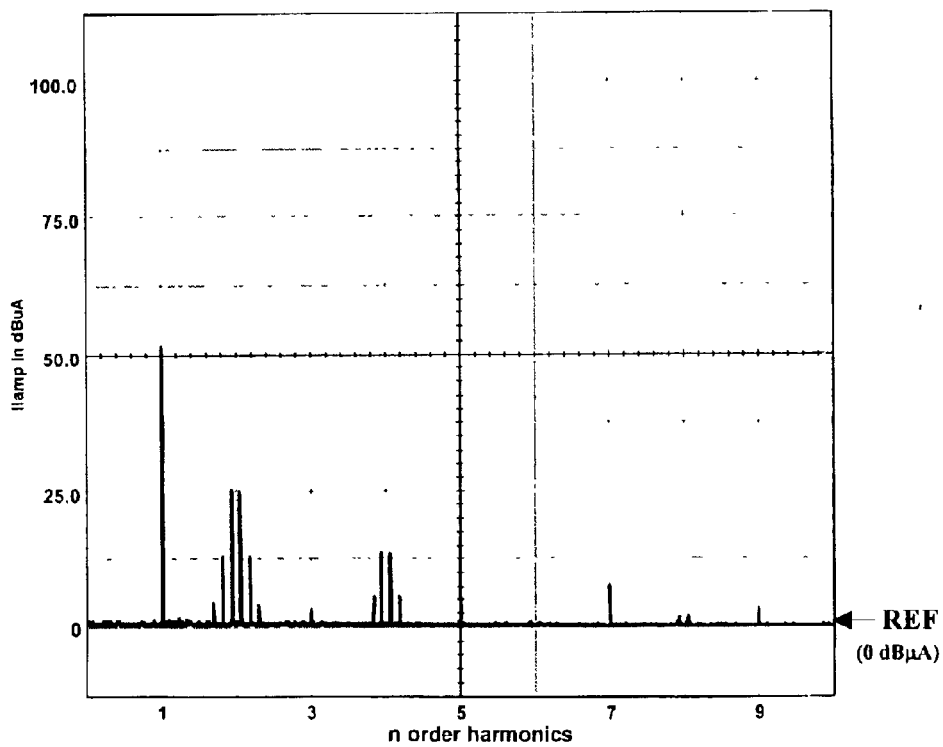
Figure 11:
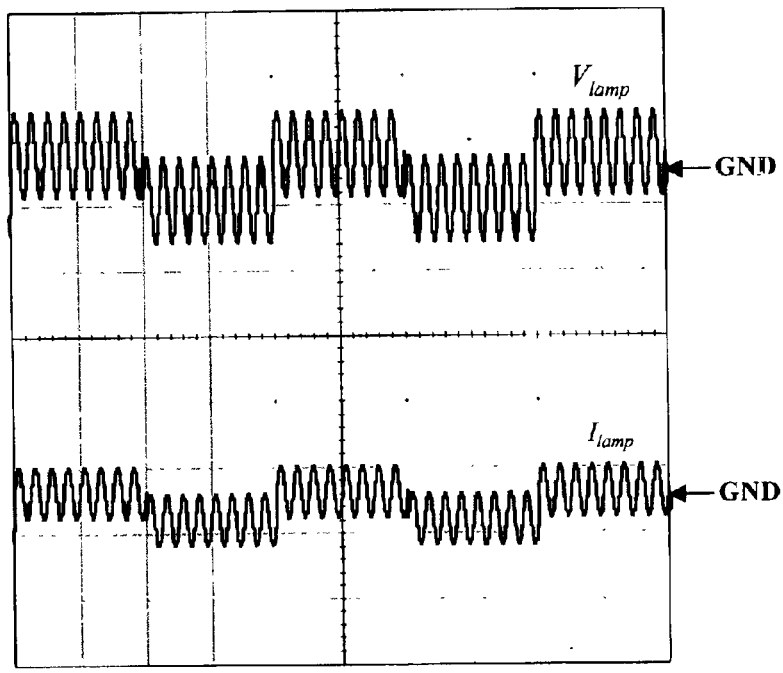
FIGS. 11(1$a$)–11(1$c$), 11(2$a$)–11(2$c$), and 11(3$a$)–11(3$c$) illustrate the responses of the lamp voltage and current at dimming luminance 100%, 50% and 5%.
Figure 11:
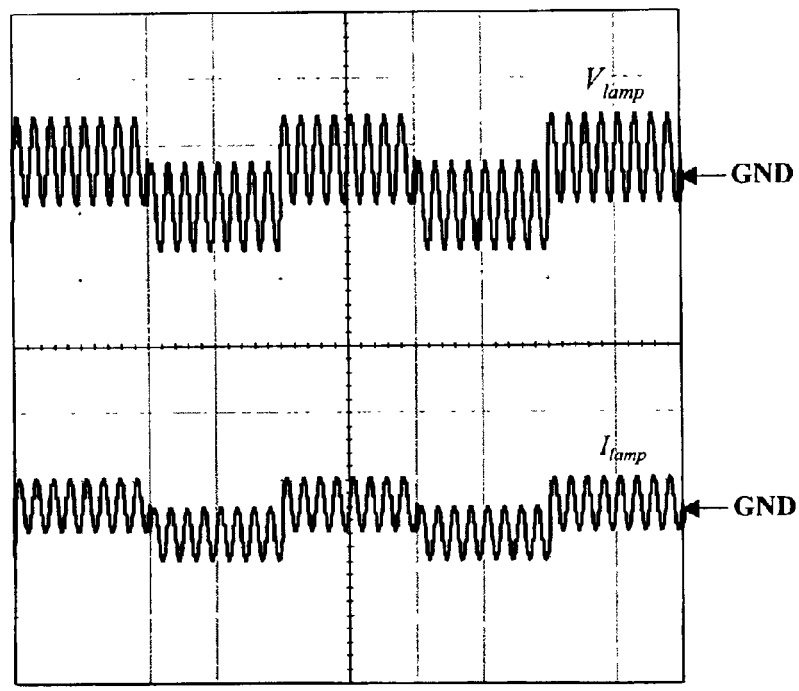
Figure 11:
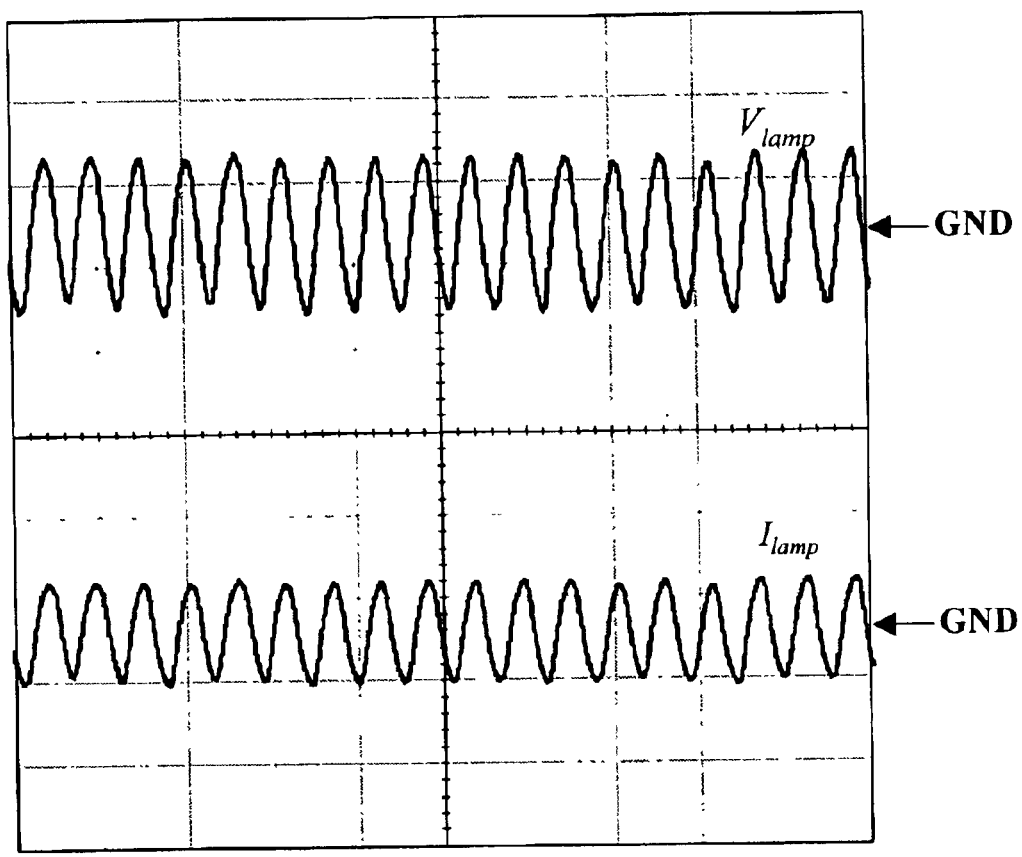
Figure 11:
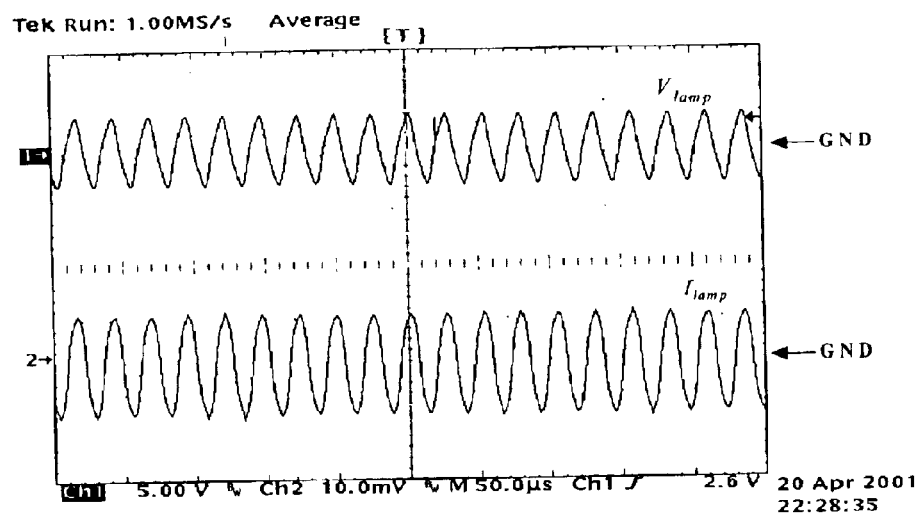
Figure 11:
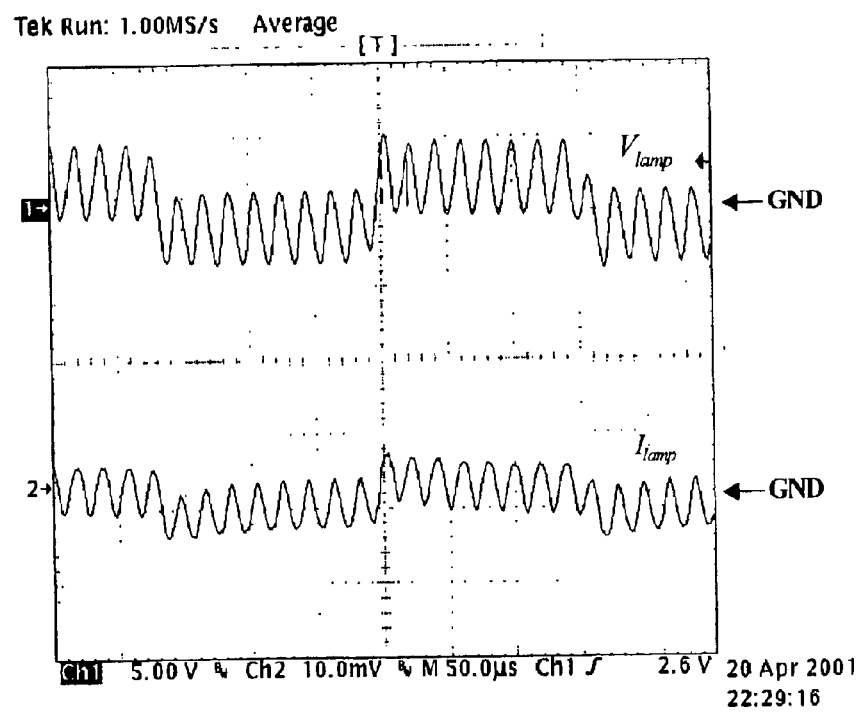
Figure 11:
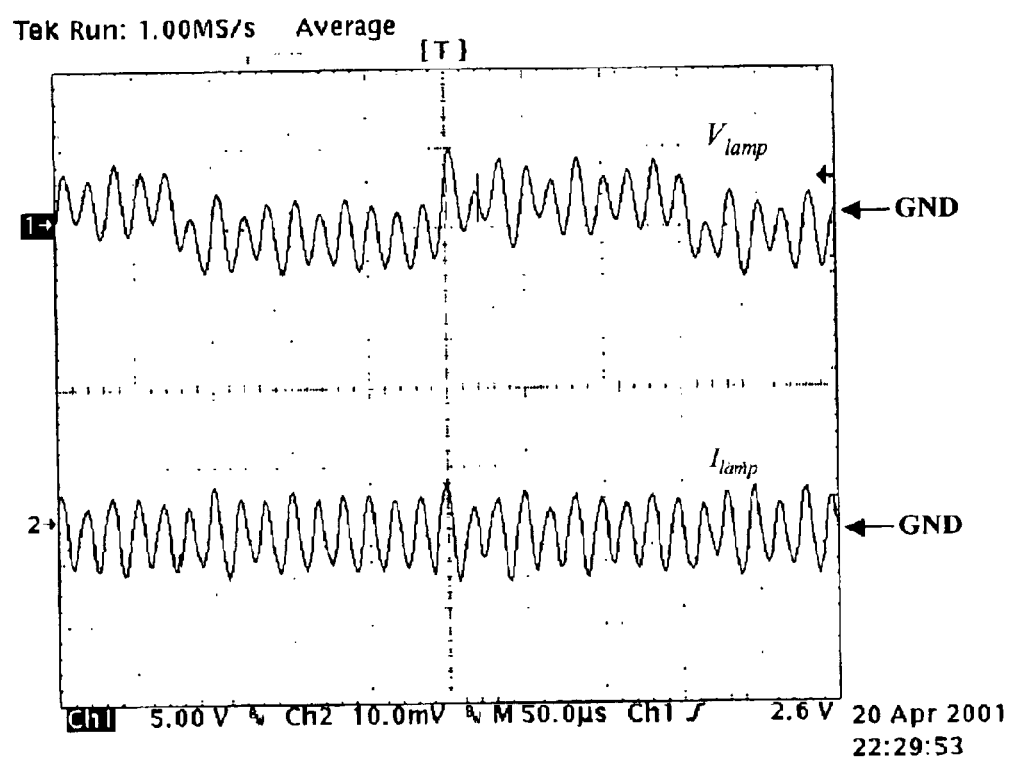
Figure 11:
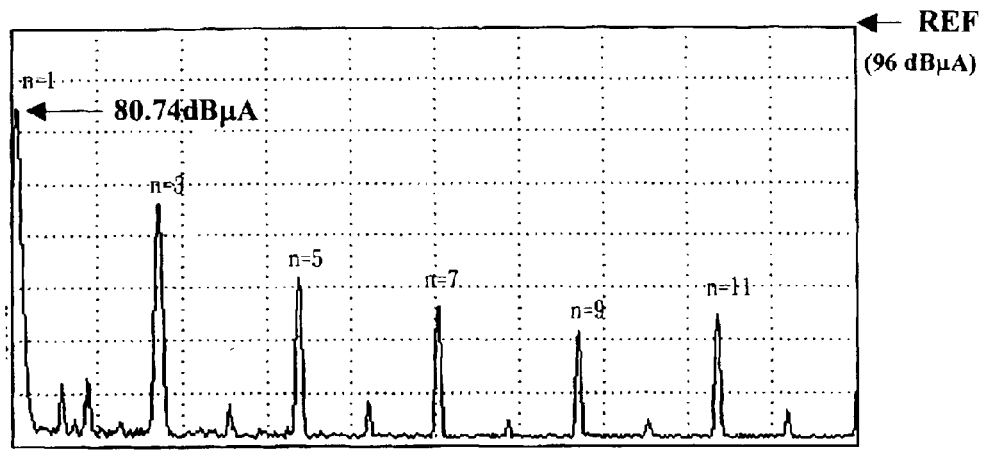
Figure 11:
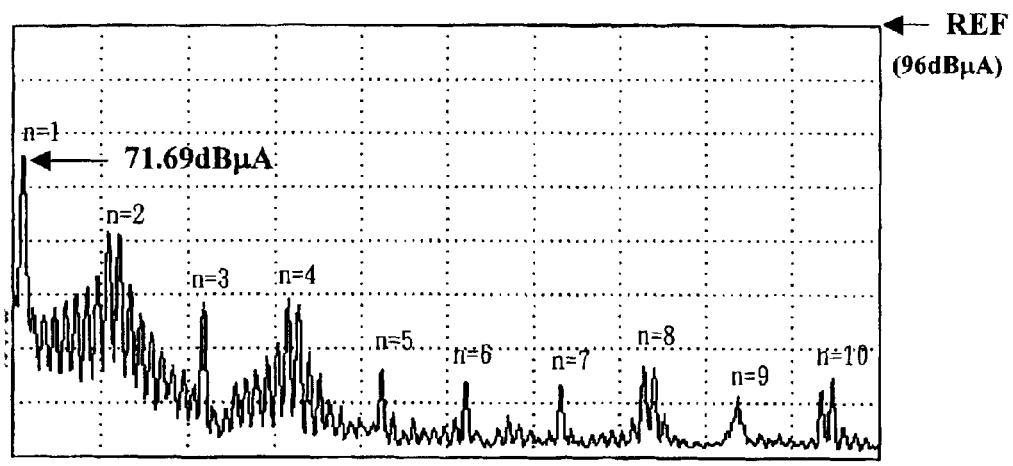
Figure 11:
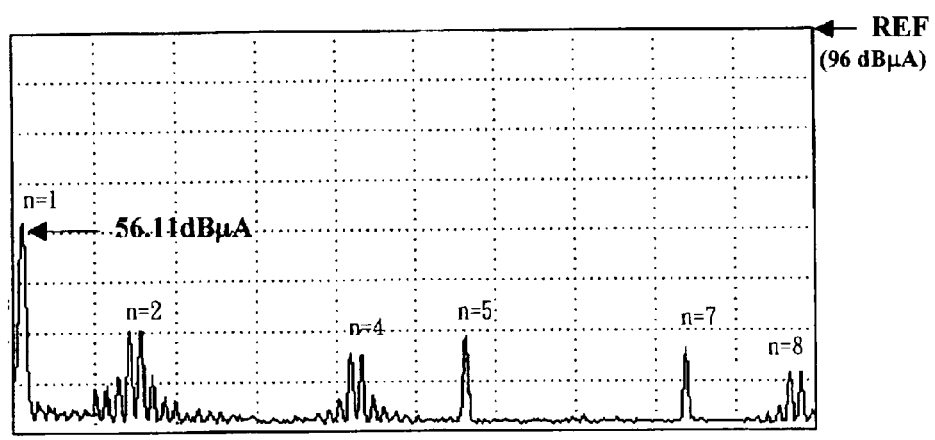

A design example for realizing controllable dimmer ballast with the proposed CAGPTG 22 is proposed. Two 40-W fluorescent lamps (FL40D-EX/38, China Electric Mfd. Co.) are used as the dimming load. The constant-duty-cycle in CDC-VCO 223 is specified as $D_{sym}$=45% and the critical frequency $f_c$ is set at 50 KHz. The duty cycle for asymmetrical modulation begins when the dimming luminance is less than 50% and is ranged from 0.20<$D_{asym}$<0.24 corresponding to 50%→1% and 50 KHz<$f_s$<60 KHz. Otherwise, the dimming process is driven by a symmetrical group-pulse train with constant-duty-cycle ($D_{sym}$=45%) control from 100%→50% of luminance with 38 KHz<$f_s$<50 KHz. The determination of the maximum constant-on time $t_{on}$ for the lowest luminance 1% is according to the maximum switching frequency. In this example, since the $f_{s,max}$=60 KHz and 0.24 $T_{s,min}$=4 µs, which is specified as the constant-on time for asymmetrical duty-cycle control. The simulated spectra of the lamp current with AGPWM controller at dimming luminance of 100% and 1% are shown in FIGS. 10(*a*) and 10(*b*). Responses of the lamp voltage and current at dimming luminance of 100%, 50%, and 1%, in time domains are respectively simulated and experimented in FIGS. 11(1*a*)–(1*c*) and 11(2*a*)–(2*c*). Only the lamp currents are measured in frequency responses for striation study as shown in FIG. 11(3*a*)–(3*c*). When the dimming luminance is over 50%, the amplitudes of the odd harmonics are more significant compared with the even ones as shown in FIG. 11(3*a*). Therefore, the striation is then not obvious in the fluorescent lamp due to the high-level luminance. However, since the amplitudes of the even harmonics are close to their neighboring ones of the odd harmonics in the spectra as shown in FIGS. 11(1*a*)–(1*c*) and 11(2*a*)–(2*c*) and no striation occurs in the lamp for wide-range dimmer. This approves the truth that the proposed CAGPTG 22 can actually provide more advantage for eliminating the striation in the fluorescent lamp.

Although the present invention has been described and illustrated in an example of the most preferred embodiment, however, the constructional characteristics of the present invention are not limited by that. The variations and modifications that anyone who is familiar with the skill can think of easily which fall within the spirit and scope of the present invention as defined by the appended claims should be included.

What is claimed is:

1. A generator used in a controllable dimmer ballast of a fluorescent lamp for eliminating a striation, comprising:
    an interface for transforming an input signal to a first input voltage and a second input voltage;
    an oscillator electrically connected to said interface for receiving said first input voltage and producing a pair of complementary pulse trains;
    a comparator electrically connected to said interface for receiving and comparing said second input voltage with a given threshold voltage and providing an enable signal; and
    a controller electrically connected to said oscillator and said comparator for alternately modulating said pulse trains and providing a first and a second control signals according to said pulse trains and said enable signal so as to eliminate said striation of said lamp, comprising:
    a square-wave generator (SWG) for generating a square-wave signal;
    a group-pulse alternator (GPA) electrically connected to said SWG for receiving said enable signal and said square-wave signal and producing two complimentary signals; and a duty-cycle-controller (DCC) electrically connected to said GPA and said oscillator for receiving said two complimentary pulse trains and said two complimentary signals and producing said first and second control signals.

2. The generator according to claim 1, wherein said generator is a controllable asymmetrical group-pulse train generator (CAGPTG).

3. The generator according to claim 1, wherein said input signal is an adjustable voltage.

4. The generator according to claim 1, wherein said oscillator is a constant-duty-cycle voltage-controlled-oscillator (CDC-VCO).

5. The generator according to claim 1, wherein said controller is an asymmetrical-group-pulse-width-modulated (AGPWM) controller.

6. The generator according to claim 1, wherein said lamp further comprising:
a first electrode and a second electrode;
a starting capacitor coupled between said first and second electrodes; and
a resonant inductor coupled between said ballast and one of said first and second electrodes of said lamp.

7. The generator according to claim 1, wherein said ballast further comprising a half-bridge series-resonant inverter (HB-SRI).

8. An apparatus used in a gas-discharging lamp with a first and a second electrodes for eliminating a striation, comprising:
an interface for transforming an input signal to a first input voltage and a second input voltage;
an oscillator electrically connected to said interface for receiving said first input voltage and producing a pair of complementary pulse trains;
a comparator electrically connected to said interface for receiving and comparing said second input voltage with a given threshold voltage and providing an enable signal;
a controller electrically connected to said oscillator and said comparator for alternately modulating said pulse trains and providing a first and a second control signals according to said pulse trains and said enable signal, comprising:
a square-wave generator (SWG) for generating a square-wave signal;
a group-pulse alternator (GPA) electrically connected to said SWG for receiving said enable signal from said comparator and said square-wave signal from said SWG and producing two complimentary signals; and
a duty-cycle-controller (DCC) electrically connected to said GPA and said oscillator for receiving said complimentary pulse trains and said complimentary signals and producing said first and second control signals; and a half-bridge series-resonant inverter (HB-SRI) for driving said lamp according to said first and second control signals, so as to eliminate said striation.

9. The apparatus according to claim 8, wherein said oscillator is a constant-duty-cycle voltage-controlled-oscillator (CDC-VCO).

10. The apparatus according to claim 8, wherein said controller is an asymmetrical-group-pulse-width-modulated (AGPWM) controller.

11. A method for preventing a light apparatus having a fluorescent lamp and a series-resonant inverter (SRI) for driving said lamp from a striation, comprising steps of:
providing an adjustable voltage;
transforming said adjustable voltage to a first input voltage and a second input voltage;
providing a pair of complementary pulse trains according to said first input voltage;
comparing said second input voltage to a given threshold voltage for providing an enable signal;
obtaining a first and a second control signals by means of alternately modulating a pulse-width of said pulse trains according to said enable signal for driving said light apparatus; and
providing said first and second control signals to said SRI of said light apparatus through executing a signal process in said SRI to reduce a plurality of odd-order harmonic amplitudes of a lamp current and to increase a plurality of even-order harmonic amplitudes of said lamp current for eliminating said striation of said lamp.

12. The method according to claim 11, wherein said first and second control signals are in a form of symmetrical constant-duty-cycle pulse trains when said adjustable voltage is greater than a specific level and said enable signal is in a first state.

13. The method according to claim 12, wherein said second control signal is in a form of asymmetrical constant-duty-cycle pulse train during a first half period of a specified low-frequency-modulated period when said adjustable voltage is less than said specific level and said enable signal is in a second state.

14. The method according to claim 13, wherein said first control signal is in said form of asymmetrical constant-duty-cycle pulse train during a second half period of said specified low-frequency-modulated period when said adjustable voltage is less than said specific level and said enable signal is in said second state.

15. The method according to claim 14, wherein said adjustable voltage is ranged from 0 to 10 v.

16. The method according to claim 14, wherein said specific level is 5 v.

17. The method according to claim 14, wherein said first state of enable signal is 0.

18. The method according to claim 14, wherein said second state of enable signal is 1.

* * * * *

UNITED STATES PATENT AND TRADEMARK OFFICE
CERTIFICATE OF CORRECTION

PATENT NO.   : 6,756,747 B2
DATED        : June 29, 2004
INVENTOR(S)  : Guan-Chyun Hsieh It is certified that error appears in the above-identified patent and that said Letters Patent is hereby corrected as shown below:

Column 3,
Line 12, replace "a given thresh threshold voltage" with -- a given threshold voltage --.

Column 4,
Line 36, add -- of -- between "responses" and "the lamp".
Line 58, replace "parasitic diodes $D_1$, and $D_2$" with -- parasitic diodes $D_1$ and $D_2$ --.

Column 5,
Line 7, replace "The lighting efficiency increase" with -- The lighting efficiency increases --.

Line 65, replace "$v_c(t)^1 = v_a(t)$" with -- $v_c(t) = v_a(t)$ --.

Line 66, replace "$v_d(t) = v_a(t)$" with -- $v_d(t) = \overline{v_a(t)}$ --.

Column 6,

Line 12, replace "$v_c(t) = v_a(t)$" with -- $v_c(t) = v_a(t)$ --.

Line 13, replace "$v_d(t) \neq v_a(t)$" with -- $v_d(t) \neq \overline{v_a(t)}$ --.

Line 16, replace "$v_c(t) \neq v_a(t)$" with -- $v_c(t) \neq v_a(t)$ --.

Line 17, replace "$v_d(t) = v_a(t)$" with -- $v_d(t) = \overline{v_a(t)}$ --.

Line 57, replace equation (3) with -- $V_{AB_n} = 2V_{DD}/n\pi$ --.

UNITED STATES PATENT AND TRADEMARK OFFICE
CERTIFICATE OF CORRECTION

PATENT NO.    : 6,756,747 B2
DATED         : June 29, 2004
INVENTOR(S)   : Guan-Chyun Hsieh It is certified that error appears in the above-identified patent and that said Letters Patent is hereby corrected as shown below:

Column 7,
Line 1, replace "$I_{Cm} = I_{Cm} e^{-j\phi Ln}$" with -- $I_{Cm} = I_{Cm} e^{-j\phi Cm}$ --.

Line 15, replace equation (9) with -- $B_o = ((R_{lamp} + 2r_o)(n^2 w_s^2 LC_s - 1))/(nw_s C_s)$ --.

Line 55, replace "typical hB-SRI ballast" with -- typical HB-SRI ballast --.
Line 59, replace "the odd harmonica exist" with -- the odd harmonics exist --.

Signed and Sealed this

Fifteenth Day of February, 2005

JON W. DUDAS
*Director of the United States Patent and Trademark Office*